(12) United States Patent
Iida

(10) Patent No.: US 12,108,290 B2
(45) Date of Patent: Oct. 1, 2024

(54) APPARATUS, METHOD OF SAME, AND STORAGE MEDIUM FOR WIRELESSLY COMMUNICATING WITH EXTERNAL DEVICE VIA A PLURALITY OF WIRELESS COMMUNICATION METHODS

(71) Applicant: CANON KABUSHIKI KAISHA, Tokyo (JP)

(72) Inventor: Kiyoshi Iida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 17/326,096

(22) Filed: May 20, 2021

(65) Prior Publication Data

US 2021/0377820 A1  Dec. 2, 2021

(30) Foreign Application Priority Data

May 29, 2020  (JP) ................................ 2020-094905

(51) Int. Cl.
*H04W 36/00* (2009.01)
*H04W 4/80* (2018.01)
(Continued)

(52) U.S. Cl.
CPC ....... *H04W 36/0055* (2013.01); *H04W 76/10* (2018.02); *H04W 4/80* (2018.02); *H04W 84/12* (2013.01)

(58) Field of Classification Search
CPC ... H04W 36/0055; H04W 76/10; H04W 4/80; H04W 84/12; H04W 36/035;
(Continued)

(56) References Cited

U.S. PATENT DOCUMENTS 9,066,228 B2 * 6/2015 Fujii ..................... H04W 12/50
2016/0269962 A1 * 9/2016 Takahashi ............... H04W 4/80
(Continued)

FOREIGN PATENT DOCUMENTS

JP  2017-103650 A  6/2017
JP  2018-011269 A  1/2018
(Continued)

*Primary Examiner* — Kashif Siddiqui
(74) *Attorney, Agent, or Firm* — Canon U.S.A., Inc. IP Division

(57) ABSTRACT

An apparatus controls a connection state of communications by a first communication circuit and communications by a second communication circuit according to characteristics of data to be transmitted and received by the second communication circuit. In a case where a characteristic of the data to be transmitted and received is a first characteristic, communications with an information processing apparatus by the second communication circuit while maintaining the connection state with the information processing apparatus by the first communication circuit. In a case where a characteristic of the data to be transmitted and received by the second communication circuit is a second characteristic, after disconnecting connection with the information processing apparatus by the first communication circuit, communications with the information processing apparatus by the second communication circuit.

19 Claims, 10 Drawing Sheets

(51) Int. Cl.
*H04W 76/10* (2018.01)
*H04W 84/12* (2009.01)

(58) Field of Classification Search
CPC ............ H04W 48/18; H04W 52/0258; H04W 52/028; H04W 76/15; H04W 84/18; H04W 88/06; Y02D 30/70
See application file for complete search history.

(56) References Cited

U.S. PATENT DOCUMENTS

| | | | |
|---|---|---|---|
| 2017/0366733 A1* | 12/2017 | Fukuya | G06F 3/0488 |
| 2019/0244602 A1* | 8/2019 | Shyong | G06F 16/9017 |
| 2019/0278390 A1* | 9/2019 | Chiang | G06F 1/1607 |
| 2019/0324925 A1* | 10/2019 | Toyoda | G06F 13/102 |
| 2019/0350014 A1* | 11/2019 | Ogata | H04W 76/10 |
| 2020/0314958 A1* | 10/2020 | Kim | H04W 88/06 |
| 2020/0344443 A1* | 10/2020 | Oyachi | H04N 5/38 |

FOREIGN PATENT DOCUMENTS

| | | | |
|---|---|---|---|
| JP | 2018014619 A | 1/2018 | |
| JP | 2019220890 A | 12/2019 | |

* cited by examiner

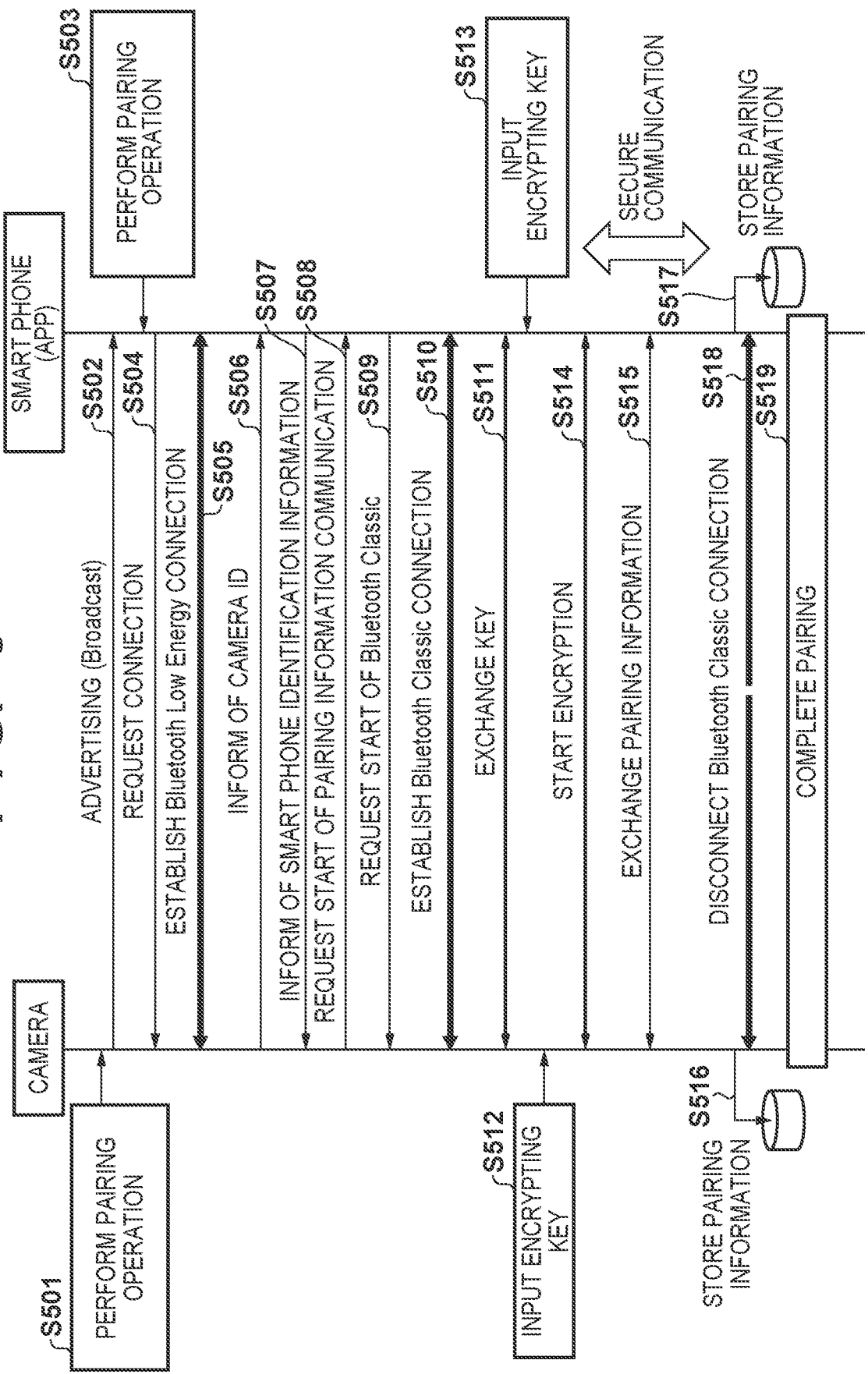

APPARATUS, METHOD OF SAME, AND STORAGE MEDIUM FOR WIRELESSLY COMMUNICATING WITH EXTERNAL DEVICE VIA A PLURALITY OF WIRELESS COMMUNICATION METHODS

BACKGROUND OF THE DISCLOSURE

Field of the Disclosure

The aspect of the embodiments relates to an apparatus, a method of the same, and a storage medium and particularly relates to technology for wirelessly communicating with an external device via a plurality of wireless communication methods.

Description of the Related Art

A communication apparatus with a function of communicating to an external device via a plurality of wireless communication methods is known. With the technology of such a known communication apparatus, a first wireless communication method is used to communicate information and a trigger for connecting via a second wireless communication method, before communication via the second wireless communication method starts (referred to as handover).

In Japanese Patent Laid-Open No. 2017-103650, technology for handing over from Bluetooth (registered trademark) Low Energy to a wireless LAN is described. In another example, the technology described in Japanese Patent Laid-Open No. 2018-011269 is for determining for the entire system whether to maintain the original communication or disconnect depending on the current state and execute accordingly in a case of a system including an image capture apparatus capable of communication via three wireless communication methods and a plurality of communication apparatuses configured to communicate with the image capture apparatus.

However, Bluetooth (registered trademark) and wireless LAN use a similar frequency band (for example, the 2.4 GHz band). Thus, in a case where a plurality of such wireless communications (for example, the first and second wireless communication) are established side by side, the throughput of the second wireless communication after handover may be reduced by the presence of the first wireless communication, for example. In other words, after handover is performed from the first wireless communication to the second wireless communication, disconnecting the first wireless communication can be expected to improve the throughput of the second wireless communication.

Also, note that if the first wireless communication is disconnected after handover, it may take time to reconnect to the first wireless communication. Thus, when handover to the second wireless communication is performed, if the first wireless communication is always disconnected, it can be expected that the time until processing using the first wireless communication is completed is wasted in a case where the first wireless communication is desired to be performed after the second wireless communication.

In light of such issues, in Japanese Patent Laid-Open No. 2017-103650, a technology for handing over to different wireless communication methods is described. However, no mention is given to controlling maintaining or disconnecting the original wireless communication after performing handover to the communications of the different wireless communication methods. Also, in Japanese Patent Laid-Open No. 2018-011269, an image capture apparatus is described which disconnects Bluetooth (registered trademark) and starts a wireless LAN connection in a case where a wireless LAN connection request is received during a Bluetooth (registered trademark) connection with an external device. However, no mention is given to controlling maintaining and disconnecting the connection of the first wireless communication taking into consideration the post-handover communication in a case where handover to a wireless LAN is performed during a Bluetooth (registered trademark) connection.

SUMMARY OF THE DISCLOSURE

One aspect of the embodiments provides an apparatus, comprising: a first communication circuit configured to perform wireless communication with an information processing apparatus via a first wireless communication method; a second communication circuit configured to perform wireless communication with the information processing apparatus via a second wireless communication method; one or more processors; and a memory storing instructions which, when the instructions are executed by the one or more processors, cause the apparatus to function as: a control unit configured to control a connection state of communications by the first communication circuit and communications by the second communication circuit according to characteristics of data to be transmitted and received by the second communication circuit after connection with the information processing apparatus by the first communication circuit, wherein the control unit, in a case where a characteristic of the data to be transmitted and received by the second communication circuit is a first characteristic, establishes communications with the information processing apparatus by the second communication circuit while maintaining the connection state with the information processing apparatus by the first communication circuit; and in a case where a characteristic of the data to be transmitted and received by the second communication circuit is a second characteristic, after disconnecting connection with the information processing apparatus by the first communication circuit, establishes communications with the information processing apparatus by the second communication circuit, and after transmitting and receiving data by the second communication circuit is complete, reconnects to the information processing apparatus by the first communication circuit.

Another aspect of the embodiments provides, a method of an apparatus comprising a first communication circuit and a second communication circuit, the method comprising: wirelessly communicating with an information processing apparatus via a first wireless communication method; wirelessly communicating with the information processing apparatus via a second wireless communication method; and controlling a connection state of communications by the first communication circuit and communications by the second communication circuit according to characteristics of data to be transmitted and received by the second communication circuit after connection with the information processing apparatus by the first communication circuit, wherein, in the controlling, in a case where a characteristic of the data to be transmitted and received by the second communication circuit is a first characteristic, communications are established with the information processing apparatus by the second communication circuit while the connection state with the information processing apparatus by the first communication circuit is maintained; and in a case where a characteristic of the data to be transmitted and received by the second communication circuit is a second characteristic, after connection with the information processing apparatus by the first communication circuit is disconnected, communications with the information processing apparatus by the second communication circuit are established, and after transmitting and receiving data by the second communication circuit is complete, reconnection to the information processing apparatus by the first communication circuit is performed.

Still another aspect of the embodiments provides, a non-transitory computer-readable storage medium comprising instructions for performing a method of an apparatus comprising a first communication circuit and a second communication circuit, the control method comprising: wirelessly communicating with an information processing apparatus via a first wireless communication method; wirelessly communicating with the information processing apparatus via a second wireless communication method; and controlling a connection state of communications by the first communication circuit and communications by the second communication circuit according to characteristics of data to be transmitted and received by the second communication circuit after connecting with the information processing apparatus by the first communication circuit, wherein, in the controlling, in a case where a characteristic of the data to be transmitted and received by the second communication circuit is a first characteristic, communications are established with the information processing apparatus by the second communication circuit while the connection state with the information processing apparatus by the first communication circuit is maintained; and in a case where a characteristic of the data to be transmitted and received by the second communication circuit is a second characteristic, after connection with the information processing apparatus by the first communication circuit is disconnected, communications with the information processing apparatus by the second communication circuit are established, and after transmitting and receiving data by the second communication circuit is complete, reconnection to the information processing apparatus by the first communication circuit is performed.

Further features of the disclosure will become apparent from the following description of exemplary embodiments (with reference to the attached drawings).

BRIEF DESCRIPTION OF THE DRAWINGS

FIG. 5 is a sequence diagram illustrating the operations of pairing in the present embodiment.

DESCRIPTION OF THE EMBODIMENTS

First Embodiment

Figure 1A:
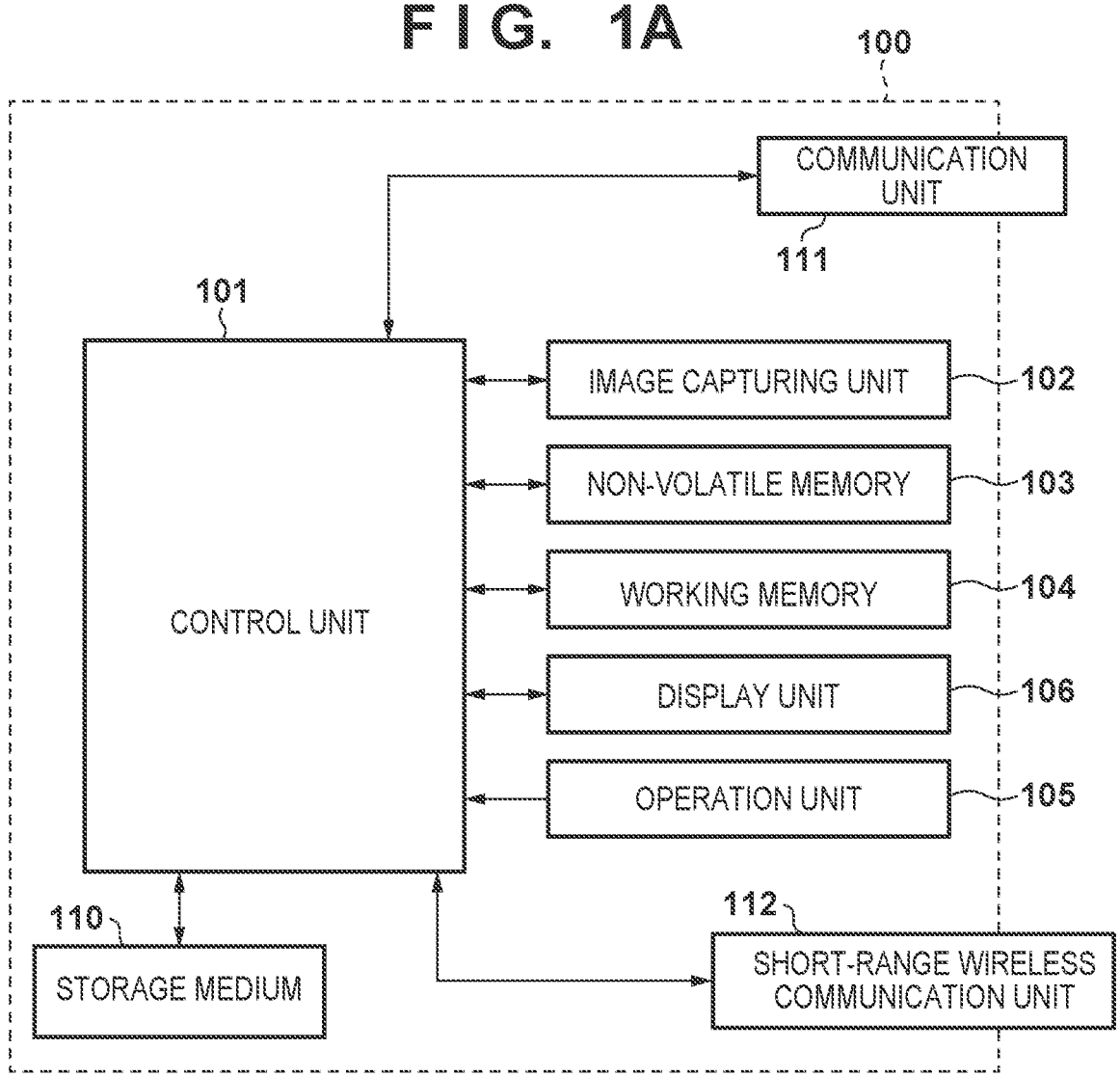
FIGS. 1A to 1C are a block diagram illustrating an example of the functional configuration of a digital camera representing an example of a communication apparatus according to a first embodiment and appearance views illustrating an example of a digital camera.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

A digital camera capable of communicating with an external device via a plurality of wireless communication methods is used as an example of a communication apparatus in the embodiment described below. However, the present embodiment is not limited to a digital camera and may be applied another device capable of communicating with an external device via a plurality of wireless communication methods. Such devices include, for example, a mobile phone such as a smartphone, a game console, a tablet terminal, a watch-type or glasses-type information terminal, a medical device, an in-vehicle system device, and the like.

Digital Camera Configuration

FIG. 1A is a block diagram illustrating a functional configuration example of a digital camera 100 representing a communication apparatus of the present embodiment. Note that one or more functional blocks illustrated in FIG. 1A may be implemented by hardware, such as an application-specific integrated circuit (ASIC) or a programmable logic array (PLA), or implemented by a programmable processor, such as a central processing unit (CPU) or a microprocessing unit (MPU), executing software. Also, these may be implemented by a combination of software and hardware. Accordingly, even if different function blocks are described as operating entities, these function blocks may be implementable by the same hardware entity.

FIG. 1A is a block diagram illustrating a configuration example of the digital camera 100 representing a communication apparatus of the present embodiment. Note that in the description, a digital camera is used as an example of a communication apparatus, but the communication apparatus is not limited thereto. For example, the communication apparatus may be an information processing apparatus, such as a portable media player, a so-called tablet device, a personal computer, or the like.

A control unit 101 includes one or more processors such as a CPU and controls each unit of the digital camera 100 according to input signals and a program described below. Note that instead of the control unit 101 controlling the entire device, a plurality of hardware may share the processing to control the entire device.

An image capturing unit 102 includes, for example, an optical system that controls an optical lens unit, the diaphragm, zoom, and focus, and the like; an image sensor for converting light (video) guided through the optical lens unit into an electrical video signal; and the like. A complementary metal oxide semiconductor (CMOS) or a charge couple device (CCD) is typically used as the image sensor. The image capturing unit 102 is controlled by the control unit 101 to convert, via the image sensor, subject light formed at the lens included in the image capturing unit 102 into an electrical signal, perform noise reduction processing and the like, and output the digital data as image data. In the digital camera 100 of the present embodiment, the image data is stored in a storage medium 110 in accordance with Design rule for Camera File system (DCF) standards.

A non-volatile memory 103 includes an electrically erasable and recordable memory such as EEPROM and stores a program described below that is executable by the control unit 101 and the like.

A working memory 104 is used as buffer memory that temporarily stores image data captured by the image capturing unit 102, image display memory for a display unit 106, working area of the control unit 101, and the like.

An operation unit 105 is used to receive instructions relating to the digital camera 100 from the user. The operation unit 105, for example, includes a power button for the user to provide ON/OFF instructions relating to the power of the digital camera 100, a release switch for image capturing instructions, and a playback button for image data playback instructions. An operation member such as a dedicated connection button for starting communication with an external device via a communication unit 111 described below is also included. Also, the operation unit 105 includes a touch panel provided on the display unit 106 described below. Note that the release switch includes SW1 and SW2. When the release switch is put in a so-called half pressed state, SW1 is set to ON. In response to this, instructions are received for performing image capture preparations, such as autofocus (AF) processing, automatic exposure (AE) processing, automatic white balance (AWB) processing, preflash emission (EF) processing, and the like. Also, when the release switch is put in a so-called fully pressed state, SW2 is set to ON. In response to this, an instruction for image capture is received.

The display unit 106 displays viewfinder images when capturing images, displays captured image data, displays alphanumerics for interactive operations, and the like. However, the display unit 106 is not necessarily a built-in unit of the digital camera 100. In one embodiment, the digital camera 100 is connected to an internal or external display unit 106 and has a display control function for controlling the display of the display unit 106.

The storage medium 110 is capable of storing image data output from the image capturing unit 102. The storage medium 110 may be detachable from the digital camera 100 or may be built in the digital camera 100. In other words, the digital camera 100 is to include a way of accessing the storage medium 110.

The communication unit 111 includes at least one communication circuit or communication module and is a communication interface for connecting to an external device. The digital camera 100 of the present embodiment is capable of sending data back and forth between an external device via the communication unit 111. For example, image data generated by the image capturing unit 102 may be transmitted to an external device via the communication unit 111. Note that in the present embodiment, the communication unit 111 includes an interface for communicating with an external device in accordance with IEEE 802.11 standards, i.e., a wireless LAN. The control unit 101 implements a wireless communication with an external device by controlling the communication unit 111. Note that the communication method is not limited to a wireless LAN and may be an infrared communication method, for example.

A short-range wireless communication unit 112, for example, includes an antenna for wireless communication and a modulation/demodulation circuit or a communication controller for processing wireless signals. The short-range wireless communication unit 112 outputs a modulated wireless signal from the antenna or demodulates a wireless signal received by the antenna to implement short-range wireless communication in accordance with IEEE 802.15 standards (i.e., Bluetooth (registered trademark)). The short-range wireless communication unit 112 is capable of controlling the establishment or disconnection of communications including communications via a Bluetooth (registered trademark) Low Energy communication method and communications via a Bluetooth (registered trademark) Classic communication method. Communications via a Bluetooth (registered trademark) Low Energy communication method and communications via a Bluetooth (registered trademark) Classic communication method both use the 2.4 GHx frequency band.

Bluetooth (registered trademark) Low Energy is not suited to transmitting and receiving large amounts of data, but has very low power consumption. Also, although Bluetooth (registered trademark) Classic cannot match the low power consumption of Bluetooth (registered trademark) Low Energy, it can encrypt the communication path and output a throughput of 1 Mbps or more (in other words, has fast communication speeds). In the present embodiment, Bluetooth (registered trademark) Low Energy is used as a non-encrypted communication path, and Bluetooth (registered trademark) Classic is established as an encrypted communication path as necessary and used for confidential information and image transfer. Note that in the examples of the present embodiment, these two Bluetooth (registered trademark) methods are used. However, in a case of communication using a similar frequency band but with different throughput, Bluetooth (registered trademark) 5 or another version of Bluetooth (registered trademark) may be used. Also, in a case of communication using a similar frequency band but with different throughput, a combination of Bluetooth (registered trademark) and communication of another communication method (for example, wireless LAN communication) or a combination of communications of other communication methods may be used.

Note that the wireless LAN communication by the communication unit 111 also uses a frequency band (for example, 2.4 GHz) similar to that of Bluetooth (registered trademark) as described above. The Bluetooth (registered trademark) communications described above may have a smaller communicable range than the wireless LAN communications (in other words, have a smaller communicable distance). Also, the Bluetooth (registered trademark) communications have slower communication speeds than the wireless LAN communications. However, the Bluetooth (registered trademark) communications have a lower power consumption than the wireless LAN communications.

Note that the communication unit 111 of the digital camera 100 of the present embodiment has an access point (AP) mode for operating as an access point in the infrastructure mode and a client (CL) mode for operating as a client in infrastructure mode. Also, when the communication unit 111 operates in CL mode, the digital camera 100 of the present embodiment is capable of operating as a CL device in infrastructure mode. In a case where the digital camera 100 is operating as a CL device, the digital camera 100 is capable of joining a network created by an AP device by connecting to an AP device nearby. Also, when the communication unit 111 operates in AP mode, the digital camera 100 of the present embodiment is capable of operating as a simple AP (hereinafter, simple AP), which is a type of AP with limited functionality. When the digital camera 100 operates as a simple AP, the digital camera 100 itself creates a network. A device near the digital camera 100 can recognize the digital camera 100 as an AP device and join the network created by the digital camera 100. A program for causing the digital camera 100 to operate as described above is stored in the non-volatile memory 103.

Note that although the digital camera 100 of the present embodiment is a type of AP, it is a simple AP without a gateway function for transfers data received from a CL device to an internet provider or the like. Accordingly, the digital camera 100 is not capable of transferring data received from another device joined to the network it created to a network such as the Internet.

Figure 1B:
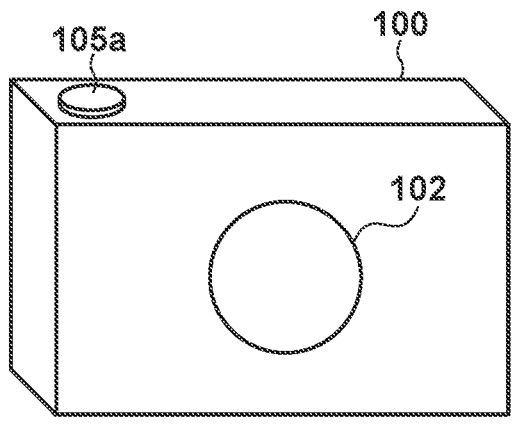
Figure 1C:
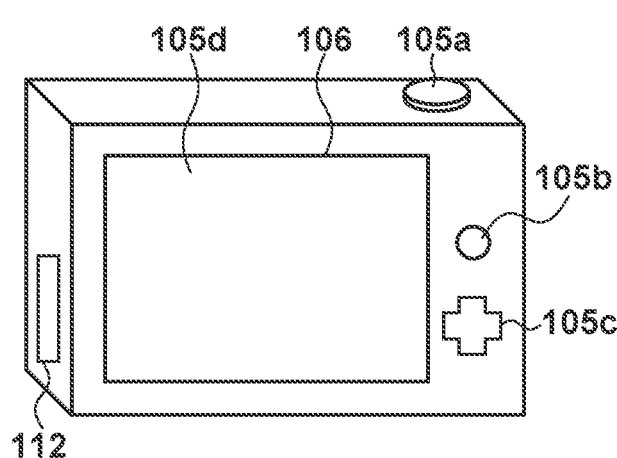

Next, the appearance of the digital camera 100 will be described. FIGS. 1B and 1C are diagrams illustrating an example of the appearance of the digital camera 100. The operation unit 105 described above includes operation members including a release switch 105a, a playback button 105b, a directional key 105c, and a touch panel 105d. Also, images obtained as a result of image capture by the image capturing unit 102 are displayed on the display unit 106.

Smart Phone Configuration

Figure 2:
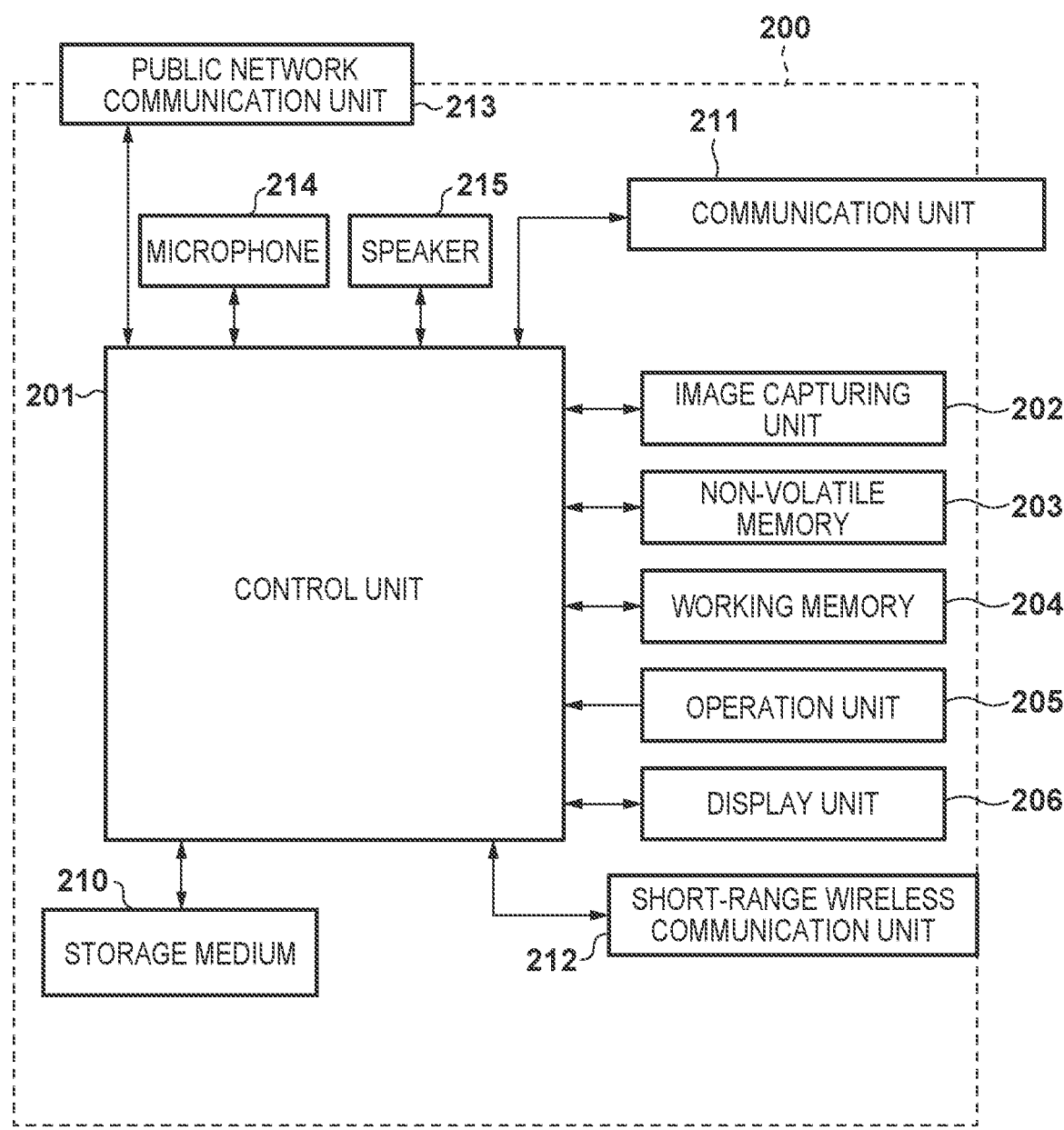
FIG. 2 is a block diagram illustrating an example of the functional configuration of a smart phone according to the present embodiment.

FIG. 2 is a block diagram illustrating a configuration example of a smart phone 200 representing an information processing apparatus of the present embodiment. Note that in the examples described below, a smart phone is used as an example of an information processing apparatus. However, the information processing apparatus is not limited thereto. For example, the information processing apparatus may be a digital camera, tablet device, or a personal computer with wireless functionality.

A control unit 201 includes one or more processors such as a CPU and controls each unit of the smart phone 200 according to input signals and a program described below. Note that instead of the control unit 201 controlling the entire device, a plurality of hardware may share the processing to control the entire device.

An image capturing unit 202 converts subject light formed at the lens included in the image capturing unit 202 into an electrical signal, perform noise reduction processing and the like, and output the digital data as image data. After the captured image data is collected in the buffer memory, the control unit 201 executes a predetermined calculation and stores it in a storage medium 210.

A non-volatile memory 203 includes an electrically erasable and recordable memory such as EEPROM. An operating system (OS), which is fundamental software executed by the control unit 201, and applications that cooperate with the OS to implementing practical functions are stored in the non-volatile memory 203. Also, in the present embodiment, applications for communicating with the digital camera 100 are stored in the non-volatile memory 203.

A working memory 204 is used as image display memory for a display unit 206, working area of the control unit 201, and the like. An operation unit 205 is used to receive instructions relating to the smart phone 200 from the user. The operation unit 205, for example, includes operation members, such as a power button for the user to provide ON/OFF instructions relating to the power of the smart phone 200, a touch panel provided on the display unit 206, and the like.

The display unit 206 displays image data, displays alphanumerics for interactive operations, and the like. However, the smart phone 200 is not necessarily provided with the display unit 206. In one embodiment, the smart phone 200 is connected to the display unit 206 and has a display control function for controlling the display of the display unit 206.

The storage medium 210 is capable of storing image data output from the image capturing unit 202. The storage medium 210 may be detachable from the smart phone 200 or may be built in the smart phone 200. In other words, the smart phone 200 is to include a way of accessing the storage medium 210.

A communication unit 211 includes at least one communication circuit or communication module and is a communication interface for connecting to an external device. The smart phone 200 of the present embodiment is capable of sending data back and forth between the digital camera 100 via the communication unit 211. In the present embodiment, the control unit 101 is capable of sending data back and forth between an external device via the communication unit 211. Note that a connection with the digital camera 100 may be a direct connection or may be a connection via an access point. As the protocol for communicating data, Picture Transfer Protocol over Internet Protocol (PTP/IP) via a wireless LAN may be used, for example. Note that the communication with the digital camera 100 is not limited thereto. For example, the communication unit 211 may include an infrared communication module, a Bluetooth (registered trademark) communication module, a Wireless USB wireless communication module, or the like. Furthermore, a wired connection, such as a USB cable, HDMI (registered trademark) IEEE 1394, or the like may be used.

A short-range wireless communication unit 212, for example, includes an antenna for wireless communication and a modulation/demodulation circuit or a communication controller for processing wireless signals. The short-range wireless communication unit 212 outputs a modulated wireless signal from the antenna or demodulates a wireless signal received by the antenna to implement short-range wireless communication in accordance with IEEE 802.15 standards. In the present embodiment, the short-range wireless communication unit 212 communicates with another device in accordance with IEEE 802.15.1 standards (i.e., Bluetooth (registered trademark)). The short-range wireless communication unit 212 is capable of controlling the establishment or disconnection of communications including communications via a Bluetooth (registered trademark) Low Energy communication method and communications via a Bluetooth (registered trademark) Classic communication method. In the present embodiment, Bluetooth (registered trademark) Low Energy is used as a non-encrypted communication path, and Bluetooth (registered trademark) Classic is established as an encrypted communication path as necessary and used for confidential information and image transfer.

A public network communication unit 213 is a communication interface used in public wireless communication. The smart phone 200 is capable of calling another device via the public network communication unit 213. When this occurs, the control unit 201 performs input and output of audio signals via a microphone 214 and a speaker 215 to implement the call. In the present embodiment, the public network communication unit 213 is an antenna, and the control unit 101 can connect to the public network via the antenna. Note that a single antenna may function as both the communication unit 211 and the public network communication unit 213.

Example of Digital Camera UI

Next, an example of a user interface (UI) displayed on the display unit 106 of the digital camera 100 will be described with reference to FIGS. 3A to 3F.

Figure 3A:
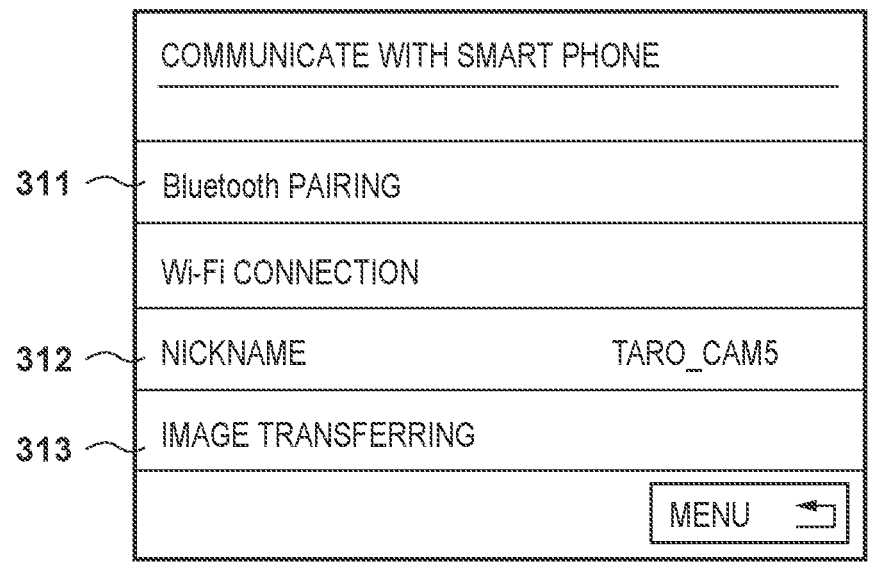
FIGS. 3A to 3F are diagrams illustrating examples of the user interface (UI) of the digital camera according to the present embodiment.
Figure 3B:
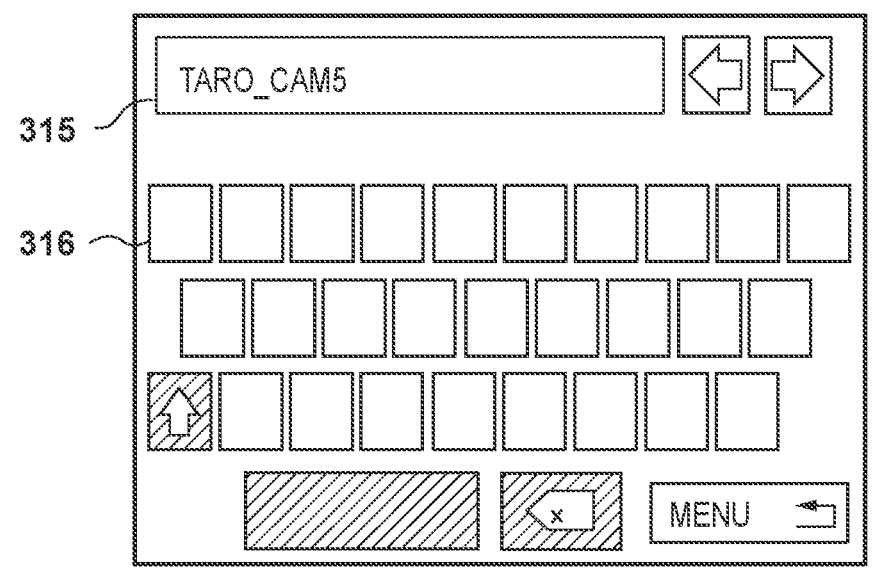
Figure 3C:
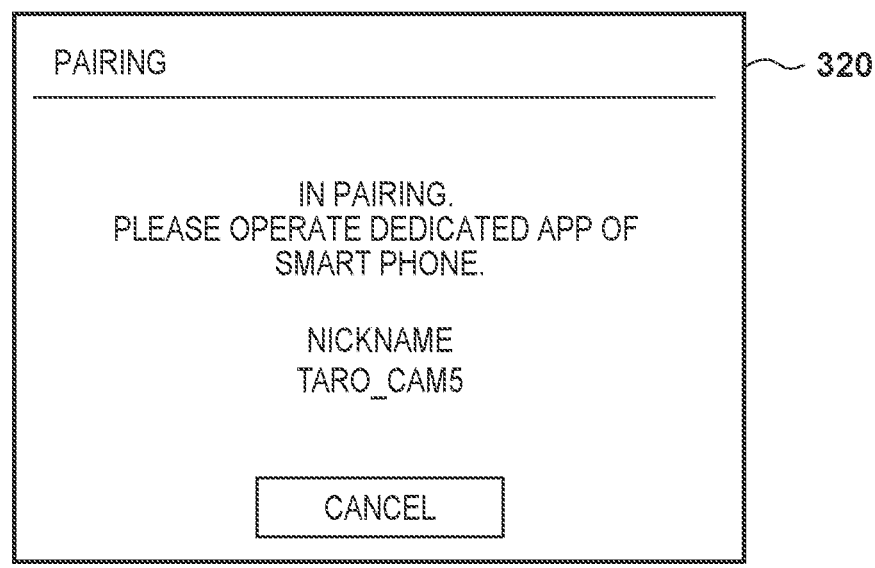
Figure 3D:
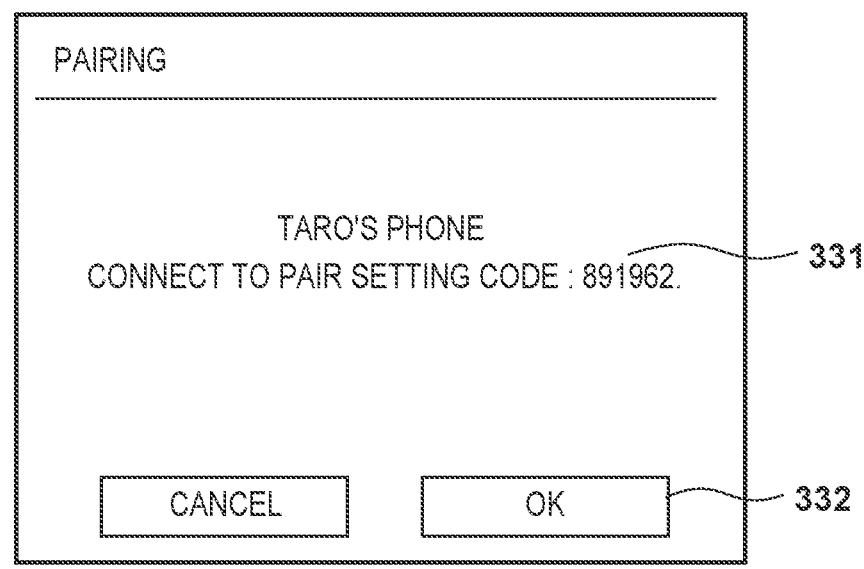
Figure 3E:
Figure 3F:
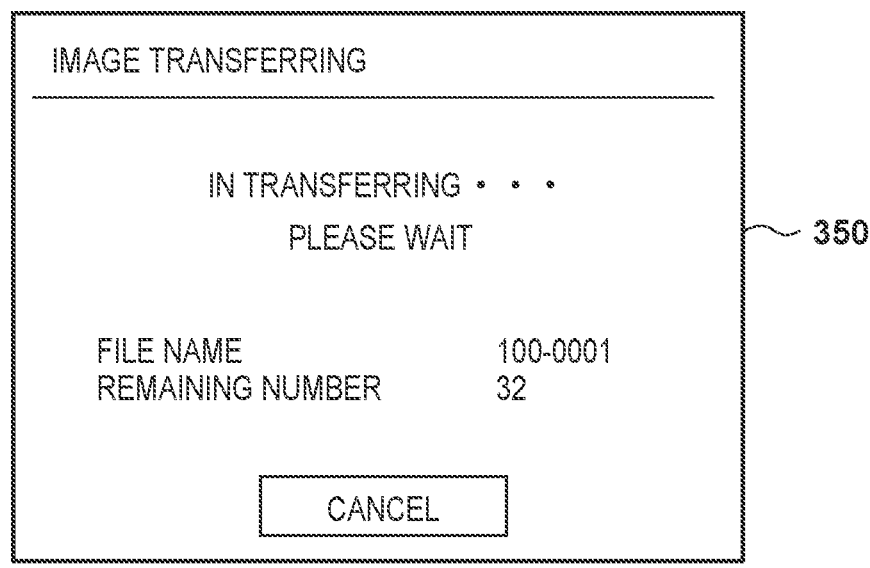

FIG. 3A is a diagram illustrating a settings screen for communication via Wi-Fi (registered trademark) and Bluetooth (registered trademark) for communicating with the smart phone 200. Bluetooth (registered trademark) pairing 311 is the settings item first performed when connecting to the smart phone 200 via Bluetooth (registered trademark).

A nickname 312 is a discretionary finite character string used to facilitate finding the user-owned digital camera 100 from a plurality of connection target devices displayed on the smart phone 200 when connecting together the digital camera 100 and the smart phone 200. When the nickname 312 is selected, the display screen transitions to a nickname input screen illustrated in FIG. 3B. With an input nickname input displayed in a display member 315, the user operates an input member 316 imitating a keyboard to set a discretionary nickname.

An image transfer 313 is a menu that becomes selectable after Bluetooth (registered trademark) pairing is completed and is a function for transmitting an image stored in the storage medium 110 to the smart phone 200 using Bluetooth (registered trademark) Classic. Image transfer will be described below. Also, the UIs illustrated in FIGS. 3C, 3D, 3E, and 3F will be described below together with a sequence diagram.

Smart Phone UI

Figure 4A:
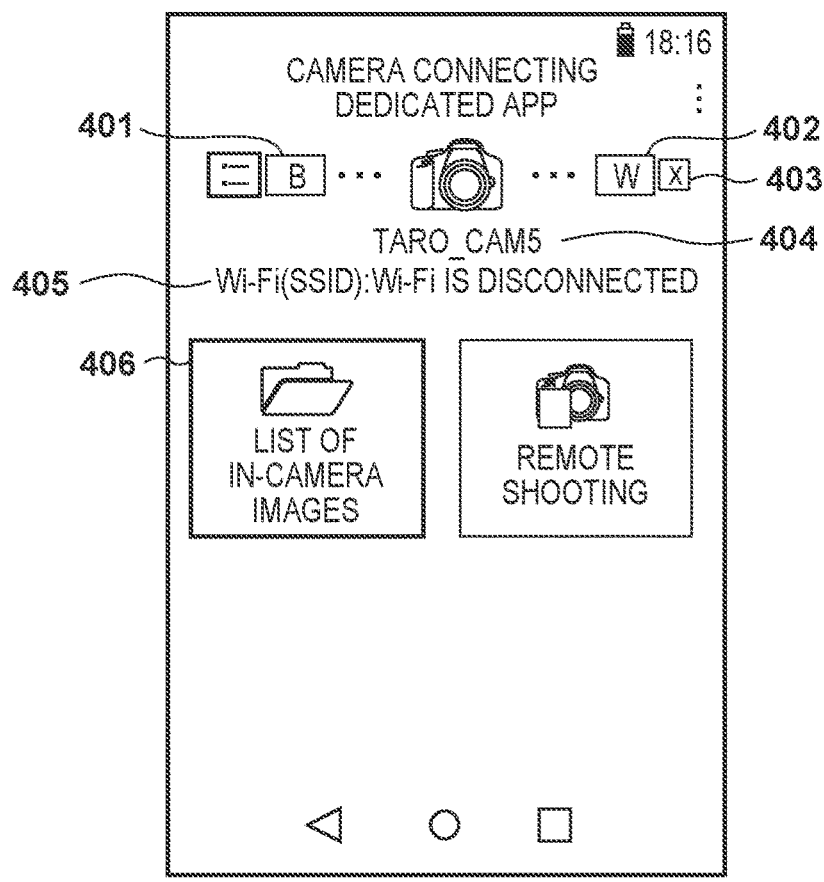
FIGS. 4A to 4D are diagrams illustrating an example of the UI of the smart phone according to the present embodiment.

FIG. 4A is a diagram illustrating a top screen of an application of the smart phone 200 for wireless communication with the digital camera 100. A Bluetooth (registered trademark) icon 401 is an icon indicating the communication state with an external device using Bluetooth (registered trademark). In a case where pairing and connection via Bluetooth (registered trademark) is not active, the Bluetooth (registered trademark) icon 401 is displayed grayed out. Also, in a case where Bluetooth (registered trademark) pair has not been completed, the menu icons such as a list of in-camera images 406 are displayed grayed out, indicating that the function is unable to be executed.

In a case where the smart phone 200 is not connected to an external device via Wi-Fi (registered trademark), a Wi-Fi (registered trademark) icon 402 and a Wi-Fi (registered trademark) disconnect icon 403 are displayed grayed out. Also, the smart phone 200 executes control so that a Wi-Fi (registered trademark) connection information 405 displays the state as being not connected. When the digital camera 100 is connected via Bluetooth (registered trademark) or by Wi-Fi (registered trademark), a nickname 404 of the digital camera 100 is displayed. The rest of the smart phone UI of FIG. 4A as well as the smart phone UIs illustrated in FIGS. 4B, 4C, and 4D will be described below together with a sequence diagram.

Bluetooth (Registered Trademark) Pairing Sequence

Next, the Bluetooth (registered trademark) pairing sequence will be described with reference to FIG. 5. Note that the operation of the digital camera 100 described below, unless otherwise mentioned, is implemented by the control unit 101 deploying a program stored in the non-volatile memory 103 on the working memory 104 and executing the program to control the units of the digital camera 100. Also, the operation of the smart phone 200, unless otherwise mentioned, is implemented by the control unit 201 deploying a program stored in the non-volatile memory 203 on the working memory 204 and executing the program to control the units of the smart phone 200.

In step S501, the digital camera 100 receives the selection of the Bluetooth (registered trademark) pairing 311 by the user on the input screen illustrated in FIG. 3A, and Bluetooth (registered trademark) Low Energy is activated. In step S502, the digital camera 100 starts the operation of periodically broadcasting advertising signals. At this time, the digital camera 100 displays a pairing in progress screen 320 illustrated in FIG. 3C on the display unit 106 and informs the user that the pairing operation is in progress.

Figure 4B:
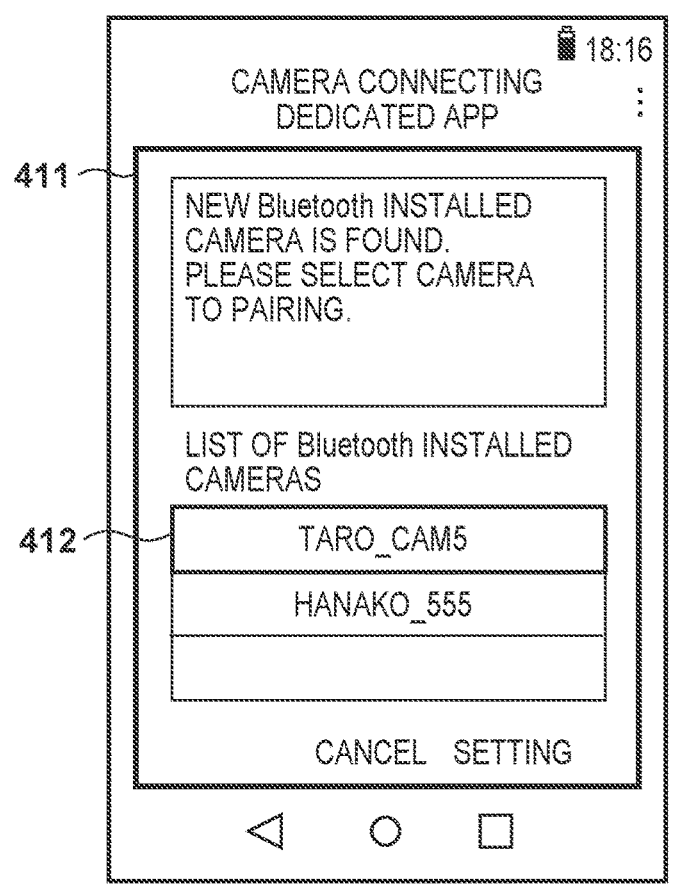
Figure 4C:
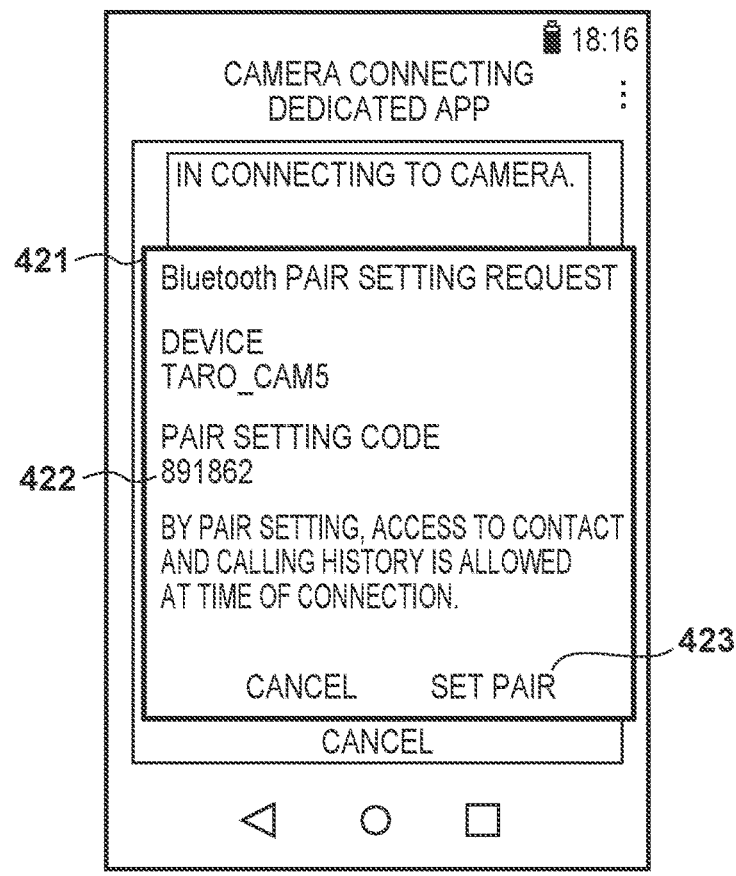

In step S504, in a case where the dedicated application illustrated in FIG. 4A is running, the smart phone 200 constantly monitors for advertising signals (transmitted from an external device such as the digital camera 100). Then, when an advertising signal that meets the conditions is detected, a dialog 411 illustrated in FIG. 4B is displayed on the display unit 206. The smart phone 200 displays the nicknames of the digital camera obtained from the advertising signals as a list of Bluetooth (registered trademark) installed cameras 412 of the dialog 411. The user can easily identify the digital camera for pairing from the list of Bluetooth (registered trademark) installed cameras 412.

In step S503, the smart phone 200 receives a selection of the digital camera 100 from the user via the list of Bluetooth (registered trademark) installed cameras 412. Then, in step S504, the smart phone 200 transmits a Bluetooth (registered trademark) Low Energy connection request to the digital camera 100.

In step S505, the digital camera 100 accepts the connection request and establishes a Bluetooth (registered trademark) Low Energy connection with the smart phone 200. In step S506, when the Bluetooth (registered trademark) Low Energy connection with the smart phone 200 is established, the digital camera 100 informs the smart phone 200 of the camera ID. The camera ID represents information for uniquely identifying the digital camera 100. Then, in step S507, the smart phone 200 transmits the smart phone identification information to the digital camera 100. The digital camera 100 obtains the smart phone identification information of the smart phone 200.

In step S508, the digital camera 100 transmits a Bluetooth (registered trademark) Classic pairing information communication start request to the smart phone 200 in order to communicate via Bluetooth (registered trademark) Classic for confidential communication of the pairing information.

In step S509, the smart phone 200 transmits a Bluetooth (registered trademark) Classic start request to the digital camera 100 in response to receiving the pairing information communication start request.

In step S510, the digital camera 100 executes procedures for Bluetooth (registered trademark) Classic connection, and a Bluetooth (registered trademark) Classic connection with the smart phone 200 is established. Then, in step S511, the digital camera 100 and the smart phone 200 exchange key information in accordance with Bluetooth (registered trademark) Classic protocol. At this time, a common pair setting code is created between the digital camera 100 and the smart phone 200. The digital camera 100 displays the screen illustrated in FIG. 3D, and the nickname of the partner to communicate with via Bluetooth (registered trademark) Classic and a pair setting code 331 are displayed. The smart phone 200 displays a dialog 421 illustrated in FIG. 4C on the display unit 206 and displays the nickname of the digital camera 100 and a pair setting code 422. At this time, the user can confirm that the pair setting code 331 displayed on the digital camera 100 and the pair setting code 422 displayed on the smart phone 200 are the same number. This is confirmation to verify that the partners in the in-progress pairing operation are the digital camera 100 and the smart phone 200 in a case where another user is performing the same operation nearby. In step S512, the digital camera 100 receives an operation on an OK button 332 illustrated in FIG. 3D. Also, in step S513, the smart phone 200 receives an operation on a set pair button 423 in the dialog 421 illustrated FIG. 4C.

In step S514, in response to an operation of the buttons of the smart phone 200 and the digital camera 100 described above, the digital camera 100 and the smart phone 200 start encryption between the two. Then, Bluetooth (registered trademark) Classic communications between the digital camera 100 and the smart phone 200 are encrypted, forming a secure line of communication. In step S515, the digital camera 100 and the smart phone 200 use this secure communication to exchange data. Specifically, an SSID used in Wi-Fi (registered trademark) handover and a security key, i.e., information for pairing, are exchanged between the digital camera 100 and the smart phone 200.

In step S516, the digital camera 100 associates the smart phone identification information obtained in step S507 with the pairing information obtained in step S515 and stores these in the non-volatile memory 103. The digital camera 100 also displays a pairing complete screen 340 illustrated in FIG. 3E on the display unit 106, informs the user that pairing is complete, and prompts for further operation of the smart phone.

In step S517, the smart phone 200 associates the pairing information obtained in step S515 with the camera ID obtained in step S506 and stores these in the non-volatile memory 203. At this time, the smart phone 200 turns on the Bluetooth (registered trademark) icon 401 illustrated in FIG. 4A and displays the nickname 404 of the digital camera. Also, the smart phone 200 informs the user that pairing with the digital camera 100 is complete by removing the grayed out display of the list of in-camera images 406.

Thereafter, in step S518, when the digital camera 100 or the smart phone 200 disconnects the Bluetooth (registered trademark) Classic connection, in step S519, Bluetooth (registered trademark) pairing is complete. In this manner, in a case of knowing beforehand that the amount of data to exchange is low and using Bluetooth (registered trademark) Classic communication for pairing, communication is performed while maintaining a Bluetooth (registered trademark) Low Energy connection.

Image Transfer Sequence via Bluetooth (Registered Trademark) Classic

Figure 6:
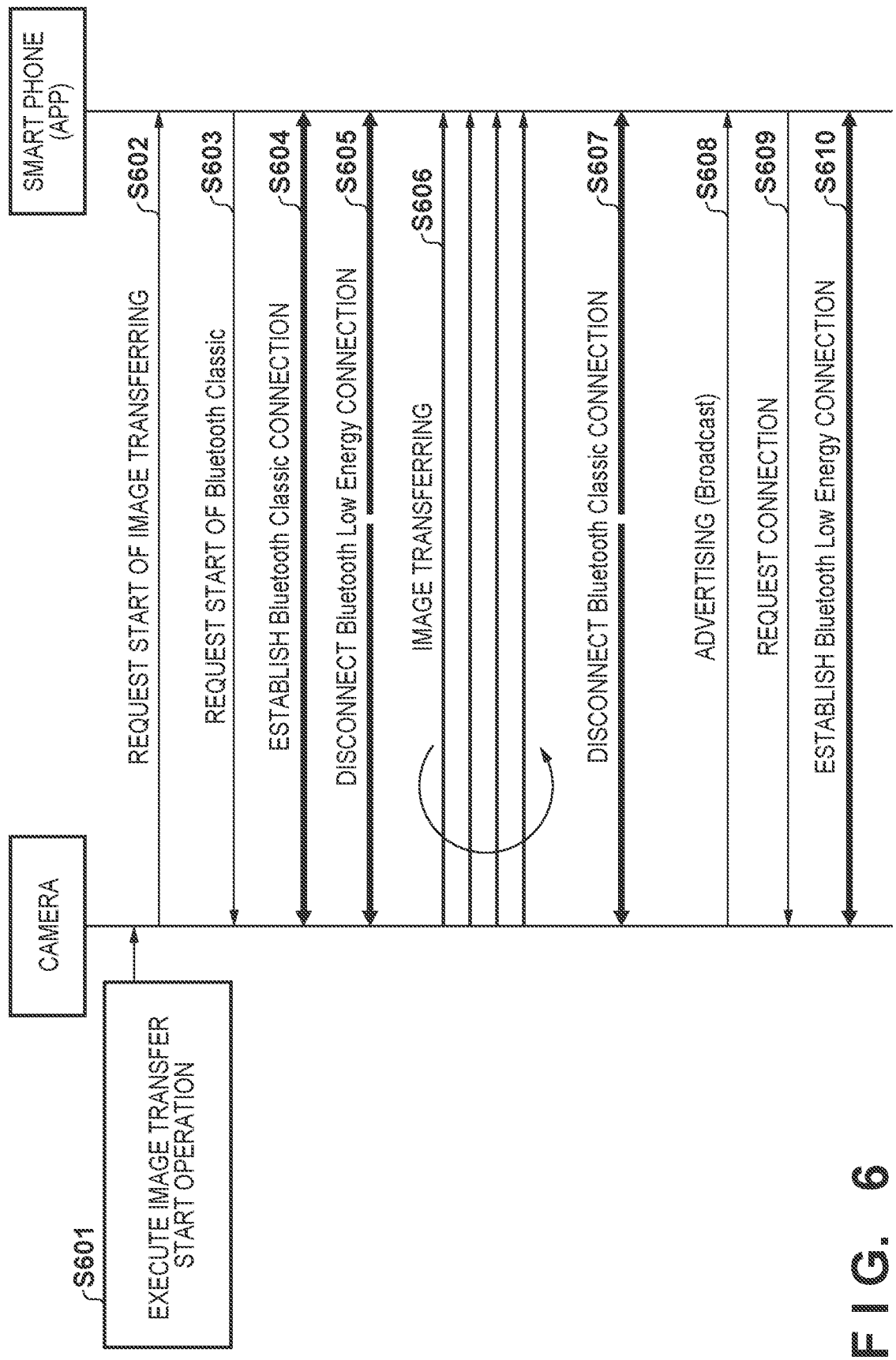
FIG. 6 is a sequence diagram illustrating the operations of image transfer in the present embodiment.

Next, a sequence of a handover to Bluetooth (registered trademark) Classic by the digital camera 100 and the smart phone 200 with an established connection via Bluetooth (registered trademark) Low Energy will be described with reference to FIG. 6. In the present embodiment, image transfer is performed via Bluetooth (registered trademark) Classic after handover. Note that the operation of the digital camera 100 described below, unless otherwise mentioned, is implemented by the control unit 101 deploying a program stored in the non-volatile memory 103 on the working memory 104 and executing the program to control the units of the digital camera 100. Also, the operation of the smart phone 200, unless otherwise mentioned, is implemented by the control unit 201 deploying a program stored in the non-volatile memory 203 on the working memory 204 and executing the program to control the units of the smart phone 200.

The image transfer function of the present embodiment is a function for compressing and sending to the smart phone 200 an image, from among images stored in the storage medium 110 of the digital camera 100, that has not been transferred to the smart phone 200. In a case where a large amount of data is to be transmitted, such as in image transfer, a wireless LAN with faster speeds than Bluetooth (registered trademark) Classic can be used as the transmission method. However, in some cases, using a wireless LAN is not appropriate. For example, depending on the type of smart phone, in a case where the application for communicating with the digital camera 100 is not active in the foreground, wireless LAN communication may be disconnected. In the present embodiment, image transfer is performed using Bluetooth (registered trademark) Classic with fast speeds than Bluetooth (registered trademark) Low Energy so that image transfer can be completed from start to finish without the user having to pay heed to it.

In step S601, the digital camera 100 receives an operation of the user selecting the image transfer 313 on the screen illustrated in FIG. 3A. Also, in step S602, the digital camera 100 transmits an image transfer start request to the smart phone 200.

Figure 4D:
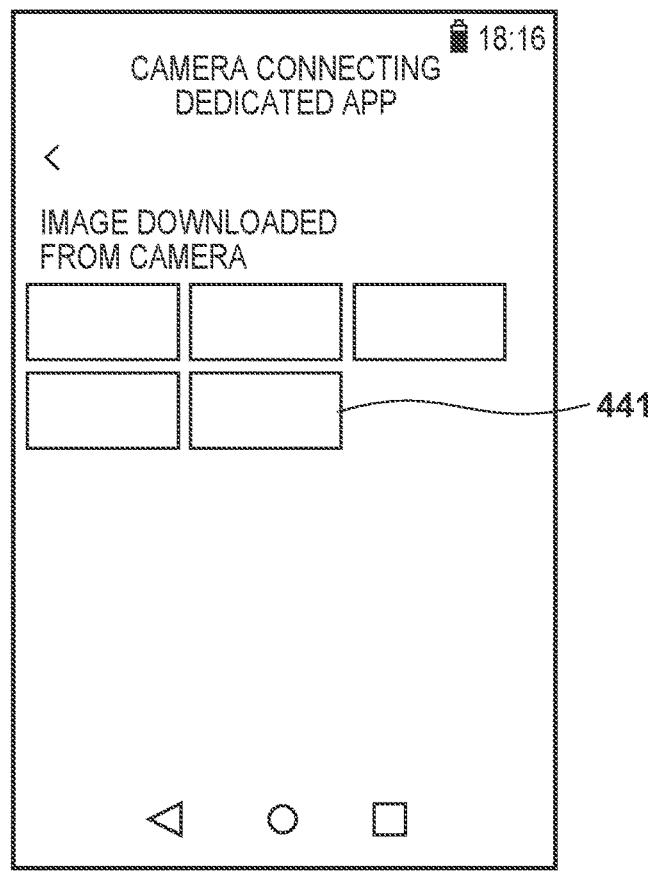

In step S603, the smart phone 200 transmits a Bluetooth (registered trademark) Classic start request to the digital camera 100 and also displays the screen illustrated in FIG. 4D. In step S604, the digital camera 100 and the smart phone 200 each execute procedures for Bluetooth (registered trademark) Classic connection, and a Bluetooth (registered trademark) Classic connection with the partner device is established.

In step S605, when the digital camera 100 and the smart phone 200 establish the Bluetooth (registered trademark) Classic connection for image transfer, the Bluetooth (registered trademark) Low Energy connection is disconnected. This is performed so that the throughput of Bluetooth (registered trademark) Classic used for image transfer is not reduced by maintaining the Bluetooth (registered trademark) Low Energy connection. In step S606, the digital camera 100 transmits image data using Bluetooth (registered trademark) Classic communications to the smart phone 200. Note that in the digital camera 100, image transfer processing can be executed in the background, and processing relating to operations such as image capture can be executed in parallel. Note that in a case where the user selects the image transfer 313 from the menu of the digital camera 100, the digital camera 100 displays an image transfer screen 350 illustrated in FIG. 3F on the display unit 106 and provided a display of the progress of image transfer and a way of cancelling the image transfer function. When the smart phone 200 receives image data, a thumbnail 441 of the image received is added and displayed on the screen illustrated in FIG. 4D.

When image transfer is completed, in step S607, the digital camera 100 disconnects the Bluetooth (registered trademark) Classic connection. In step S608, the digital camera 100 starts transmitting advertising signals to re-establish communications with the smart phone 200 via Bluetooth (registered trademark) Low Energy.

In step S609, the smart phone 200 transmits a connection request to the digital camera 100. Also, in step S610, the digital camera 100 establishes a Bluetooth (registered trademark) Low Energy connection in response to receiving a connection request from the smart phone 200.

In this manner, in a case where a large amount of data is transmitted via Bluetooth (registered trademark) Classic, the Bluetooth (registered trademark) Low Energy connection is disconnected. This reduces the effects of Bluetooth (registered trademark) Low Energy and minimizes or prevents a reduction in the throughput of Bluetooth (registered trademark) Classic communications.

Figure 7:
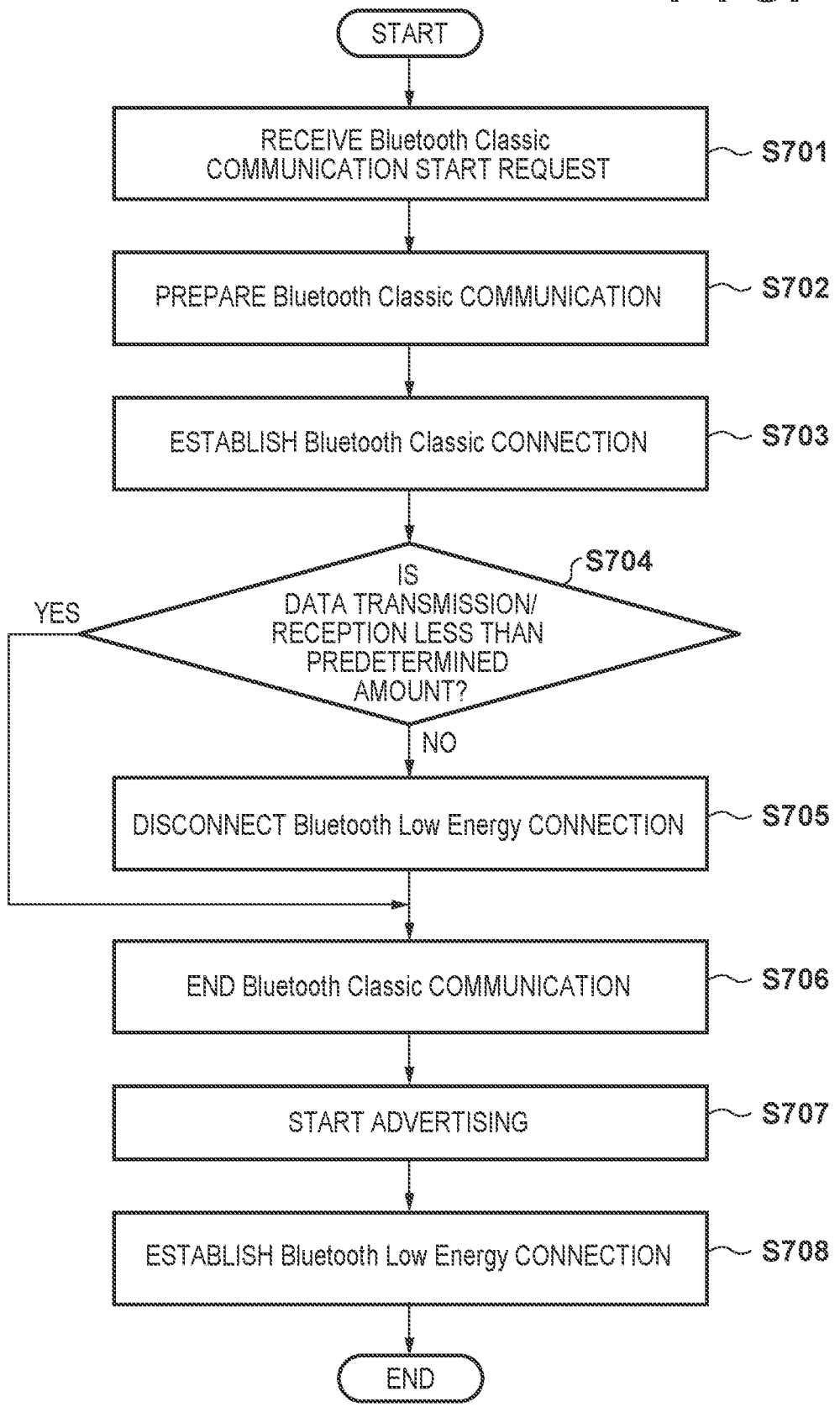
FIG. 7 is a flowchart illustrating a series of operations relating to the digital camera according to the present embodiment.

Digital Camera Operations of Bluetooth (Registered Trademark) Classic Communications Next, operations of the digital camera 100 when handover is performed to Bluetooth (registered trademark) Classic communications from a state in which a Bluetooth (registered trademark) Low Energy connection is established will be described with reference to FIG. 7. Note that the operation of the digital camera 100 described below, unless otherwise mentioned, is implemented by the control unit 101 deploying a program stored in the non-volatile memory 103 on the working memory 104 and executing the program to control the units of the digital camera 100.

In step S701, a Bluetooth (registered trademark) Classic start request is received from the smart phone 200. In step S702, the digital camera 100 starts Bluetooth (registered trademark) Classic communications preparations in response to receiving the start request. Specifically, the digital camera 100 starts up a service for data communications such as Serial Port Profile (SPP) in Bluetooth (registered trademark) Classic. Also, using Service Discovery Protocol (SDP), a connection request is waited for by enabling detection of an SPP service of the digital camera 100 from the smart phone 200, i.e., the Bluetooth (registered trademark) Classic master.

In step S703, when the digital camera 100 receives a Bluetooth (registered trademark) Classic connection request from the smart phone 200, a Bluetooth (registered trademark) Classic connection with the digital camera 100 is established. At this time, the digital camera 100 knows the target of the Bluetooth (registered trademark) Classic communications from the operations and communication target of the digital camera 100.

In step S704, the digital camera 100 determines whether or not to transmit and receive data of a predetermined amount or greater via the Bluetooth (registered trademark) Classic connection. In other words, the digital camera 100 determines the characteristics of the data to be transmitted and received via Bluetooth (registered trademark) Classic. For example, a data table including the operation contents, such as pairing operations and image transfer, and the characteristics (for example, amount of data to be transmitted and received) of the data to be transmitted and received associated in advance is stored in the non-volatile memory 103. The digital camera 100 reads out the data table and obtains the characteristics (amount of data to be transmitted and received) of the data with respect to the operation contents. For example, in a case where the amount of data to be transmitted and received via Bluetooth (registered trademark) Classic is determined to be less than a predetermined amount, such as in a pairing operation, the process proceeds to step S706. In this case, the digital camera 100 maintains the Bluetooth (registered trademark) Low Energy connection and executes communication for a pairing operation, for example. Also, in a case where the digital camera 100 determines that the amount of data to be transmitted and received via Bluetooth (registered trademark) Classic is a predetermined amount or greater, the process proceeds to step S705. Note that in a case where the digital camera 100 cannot determine the amount of data to be transmitted and received via Bluetooth (registered trademark) Classic, it is determined that the amount of data to be transmitted and received is a predetermined amount or greater.

Note that in the example process described herein, the characteristics of the data to be transmitted and received via Bluetooth (registered trademark) Classic are used in the determination. However, no such limitation is intended. The digital camera 100 may use in the determination whether or not the transmitting and receiving of data via Bluetooth (registered trademark) Classic is confidential information communication, or use this in combination with determining the amount of data to be transmitted and received. In this case, the operation contents, such as pairing operations and image transfer, and characteristics (for example, whether or not the data to be transmitted and received is confidential information) of the data to be transmitted and received are associated in the data table described above.

In step S705, the digital camera 100 disconnects the Bluetooth (registered trademark) Low Energy connection so that a large amount of data can be transmitted and received via Bluetooth (registered trademark) Classic, such as for transmission of image data.

In step S706, when data communication via Bluetooth (registered trademark) Classic is complete, the digital camera 100 disconnects the Bluetooth (registered trademark) Classic connection and completes Bluetooth (registered trademark) Classic communications.

In step S707, the digital camera 100 starts advertising to restart communications via Bluetooth (registered trademark) Low Energy. In step S708, the digital camera 100 establishes a Bluetooth (registered trademark) Low Energy connection with the smart phone 200 when the digital camera 100 receives a connection request from the smart phone 200. When the digital camera 100 establishes a Bluetooth (registered trademark) Low Energy connection, the process then ends.

As described above, in the present embodiment, according to the characteristics of the data to be transmitted and received via Bluetooth (registered trademark) Classic, the communications and the connection state of the Bluetooth (registered trademark) Low Energy communications established in advance are controlled. Specifically, in a case where the digital camera 100 determines to transmit and receive data of a predetermined amount or greater via Bluetooth (registered trademark) Classic communications, the digital camera 100 disconnects the pre-established Bluetooth (registered trademark) Low Energy connection. This allows a reduction in the throughput of necessary communications using Bluetooth (registered trademark) Classic to be prevented. Also, in a case where it is determined to not transmit and receive data of a predetermined amount or greater via Bluetooth (registered trademark) Classic communications, the Bluetooth (registered trademark) Low Energy connection is maintained. This effectively reduces the communication by removing the overhead involved in reconnecting the Bluetooth (registered trademark) Low Energy connection.

Note that in the embodiments described above, the two communications (Bluetooth (registered trademark) Low Energy and Bluetooth (registered trademark) Classic both use a similar frequency band. However, the embodiments described above may be applied to configurations in which the frequency bands used in both communications partially overlap one another. In these cases, an effect similar to the effects described above can be achieved.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-094905, filed May 29, 2020, which is hereby incorporated by reference herein in its entirety.

What is claimed is:

1. An apparatus, comprising:
   a first communication circuit configured to perform wireless communication with an information processing apparatus via a first wireless communication method;
   a second communication circuit configured to perform wireless communication with the information processing apparatus via a second wireless communication method;
   one or more processors; and
   a memory storing instructions which, when the instructions are executed by the one or more processors, cause the one or more processors to:
   control a connection state of communications by the first communication circuit and communications by the second communication circuit according to characteristics of data to be shared by the second communication circuit after connection with the information processing apparatus by the first communication circuit, wherein
   the instructions cause the one or more processors to determine whether to perform a pairing operation with the information processing apparatus or to perform an image transfer operation,
   wherein when the one or more processors determine to perform the pairing operation, the instructions cause the one or more processors to establishes communications with the information processing apparatus by the second communication circuit while maintaining the connection state with the information processing apparatus by the first communication circuit, and shares data by the second communication circuit; and
   when the one or more processors determine to perform the image transfer operation, the instructions cause the one or more processors to, after disconnecting connection with the information processing apparatus by the first communication circuit, establishes communications with the information processing apparatus by the second communication circuit, and after sharing data by the second communication circuit is complete, performs a process for reconnecting to the information processing apparatus by the first communication circuit.

2. The apparatus according to claim 1, wherein the pairing operation includes communication of sharing data less than a predetermined amount by the second communication circuit, and the image transfer operation includes communication of sharing data equal to or greater than the predetermined amount by the second communication circuit.

3. The apparatus according to claim 1, wherein the instructions cause the one or more processors to determine whether to perform the pairing operation or to perform the image transfer operation based on a transmission and reception data amount associated with operation contents relating to the apparatus.

4. The apparatus according to claim 1, wherein communications by the first communication circuit are unencrypted wireless communications.

5. The apparatus according to claim 1, wherein communications by the second communication circuit are encrypted wireless communications.

6. The apparatus according to claim 1, wherein the instructions cause the one or more processors to communicate confidential information and image data via sharing by the second communication circuit.

7. The apparatus according to claim 1, wherein communications by the second communication circuit have faster communication speeds than communications by the first communication circuit.

8. The apparatus according to claim 1, wherein power consumption of communications by the first communication circuit is less than power consumption of communications by the second communication circuit.

9. The apparatus according to claim 1, wherein a frequency band used in communications by the first communication circuit and a frequency band used in communications by the second communication circuit partially overlap.

10. A method of a communication apparatus comprising a first communication circuit and a second communication circuit, the method comprising:
   wirelessly communicating with an information processing apparatus via a first wireless communication method;
   wirelessly communicating with the information processing apparatus via a second wireless communication method; and
   controlling a connection state of communications by the first communication circuit and communications by the second communication circuit according to characteristics of data to be shared by the second communication circuit after connection with the information processing apparatus by the first communication circuit, wherein
   the controlling comprises determining whether to perform a pairing operation with the information processing apparatus or to perform an image transfer operation;
   when it is determined that the pairing operation is performed, communications are established with the information processing apparatus by the second communication circuit while the connection state with the information processing apparatus by the first communication circuit is maintained, and the data is shared by the second communication circuit; and
   when it is determined that the image transfer operation is performed, after connection with the information processing apparatus by the first communication circuit is disconnected, communications with the information processing apparatus by the second communication circuit are established, and after sharing data by the second communication circuit is complete, a process for reconnection to the information processing apparatus by the first communication circuit is performed.

11. The method according to claim 10,
wherein the pairing operation includes communication of sharing data less than a predetermined amount by the second communication circuit, and the image transfer operation includes communication of sharing data equal to or greater than the predetermined amount by the second communication circuit, and
wherein a frequency band used in communications by the first communication circuit and a frequency band used in communications by the second communication circuit partially overlap.

12. The method according to claim 10, wherein the controlling comprises determining whether to perform the pairing operation or to perform the image transfer operation based on a transmission and reception data amount associated with operation contents relating to the apparatus.

13. The method according to claim 10,
wherein communications by the first communication circuit are unencrypted wireless communications, and
wherein communications by the second communication circuit are encrypted wireless communications.

14. The method according to claim 10,
wherein communications by the second communication circuit have faster communication speeds than communications by the first communication circuit, and
wherein power consumption of communications by the first communication circuit is less than power consumption of communications by the second communication circuit.

15. A non-transitory computer-readable storage medium comprising instructions for performing a method of an apparatus comprising a first communication circuit and a second communication circuit, the method comprising:
wirelessly communicating with an information processing apparatus via a first wireless communication method;
wirelessly communicating with the information processing apparatus via a second wireless communication method; and
controlling a connection state of communications by the first communication circuit and communications by the second communication circuit according to characteristics of data to be shared by the second communication circuit after connecting with the information processing apparatus by the first communication circuit, wherein the controlling comprises determining whether to perform the pairing operation with the information processing apparatus or to perform the image transfer operation;
when it is determined that the pairing operation is performed, communications are established with the information processing apparatus by the second communication circuit while the connection state with the information processing apparatus by the first communication circuit is maintained, and the data is shared by the second communication circuit; and
when it is determined that the image transfer operation is performed, after connection with the information processing apparatus by the first communication circuit is disconnected, communications with the information processing apparatus by the second communication circuit are established, and after sharing data by the second communication circuit is complete, a process for reconnection to the information processing apparatus by the first communication circuit is performed.

16. The non-transitory computer-readable storage medium according to claim 15,
wherein the pairing operation includes communication of sharing data less than a predetermined amount by the second communication circuit, and the image transfer operation includes communication of sharing data equal to or greater than the predetermined amount by the second communication circuit, and
wherein a frequency band used in communications by the first communication circuit and a frequency band used in communications by the second communication circuit partially overlap.

17. The non-transitory computer-readable storage medium according to claim 15, wherein the controlling comprises determining whether to perform the pairing operation or to perform the image transfer operation based on a transmission and reception data amount associated with operation contents relating to the apparatus.

18. The non-transitory computer-readable storage medium according to claim 15,
wherein communications by the first communication circuit are unencrypted wireless communications, and
wherein communications by the second communication circuit are encrypted wireless communications.

19. The non-transitory computer-readable storage medium according to claim 15,
wherein communications by the second communication circuit have faster communication speeds than communications by the first communication circuit, and
wherein power consumption of communications by the first communication circuit is less than power consumption of communications by the second communication circuit.

* * * * *